(12) United States Patent
Oguma et al.

(10) Patent No.: US 11,070,133 B2
(45) Date of Patent: Jul. 20, 2021

(54) POWER SYSTEM

(71) Applicant: Honda Motor Co., Ltd., Tokyo (JP)

(72) Inventors: Hirokazu Oguma, Saitama (JP);
Hisaya Oiwa, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 10 days.

(21) Appl. No.: 16/805,855

(22) Filed: Mar. 2, 2020

(65) Prior Publication Data

US 2020/0295660 A1    Sep. 17, 2020

(30) Foreign Application Priority Data

Mar. 14, 2019 (JP) .............................. JP2019-046999

(51) Int. Cl.
| | | |
|---|---|---|
| *H02M 3/335* | (2006.01) | |
| *H02J 1/10* | (2006.01) | |
| *H02M 1/32* | (2007.01) | |
| *H02M 3/158* | (2006.01) | |
| *H02M 1/00* | (2006.01) | |

(52) U.S. Cl.
CPC ......... *H02M 3/33507* (2013.01); *H02J 1/106* (2020.01); *H02M 1/32* (2013.01); *H02M 3/1584* (2013.01); *H02M 1/0009* (2021.05)

(58) Field of Classification Search
CPC ..... H02M 3/33507; H02M 2001/0009; H02M 3/1584; H02J 1/106; H02J 2310/48
See application file for complete search history.

(56) References Cited

U.S. PATENT DOCUMENTS

| 5,602,462 A * | 2/1997 | Stich ...................... G05F 1/147 |
| --- | --- | --- |
| | | 323/258 |
| 10,855,183 B1* | 12/2020 | Barrenscheen ..... H02M 3/1582 |
| 2016/0276823 A1* | 9/2016 | Himeno ................ H02J 7/1423 |

FOREIGN PATENT DOCUMENTS

JP            2017169311            9/2017

* cited by examiner

*Primary Examiner* — Adolf D Berhane
*Assistant Examiner* — Afework S Demisse
(74) *Attorney, Agent, or Firm* — JCIPRNET

(57) ABSTRACT

A power system includes: a first power circuit having a first battery; a second power circuit having a second battery, wherein a used voltage range of the second battery with respect to a closed circuit voltage overlaps with the first battery, and a static voltage of the second battery is lower than the first battery; a voltage converter, converting a voltage between the first and the second power circuit; a power converter, converting power between the first power circuit and a driving motor; a current sensor; a passing current control section, operating the voltage converter so that the passing current becomes a target current; and a failure determining section. The failure determining section determines the voltage converter fails in a case where the difference is greater than a threshold and the passing current flows from the side of the first power circuit to the side of the second power circuit.

16 Claims, 7 Drawing Sheets

POWER SYSTEM

CROSS-REFERENCE TO RELATED APPLICATION

This application claims the priority of patent Japan application serial no. 2019-046999, filed on Mar. 14, 2019. The entirety of the above-mentioned patent application is hereby incorporated by reference herein and made a part of this specification.

BACKGROUND

Technical Field

The disclosure relates to a power system. More specifically, the disclosure relates to a power system including a high voltage power source and a low voltage power source whose used voltage ranges with respect to closed circuit voltages overlap.

Description of Related Art

In recent years, electric vehicles such as electric conveying machines including driving motors as power generating source, hybrid vehicles including driving motors and internal combustion engines as power generating source, etc., are undergoing progressive development. In such an electric vehicle, a power apparatus such as a power storage device (battery, capacitor, etc.), a fuel cell, etc., is mounted to supply electric energy to the driving motor. Also, in recent years, an electric vehicle in which a plurality of power apparatuses having different characteristics is also under development.

Patent Document 1 (Japanese Laid-Open No. 2017-169311) discloses a power system of an electric vehicle. The power system includes: a power circuit connecting a driving part, which is formed by a driving motor, an inverter, etc., and a first power storage device; a second power storage device connected with the power circuit via a voltage converter; and a control apparatus exerting switching control on the voltage converter. The control device sets a target current with respect to a passing current that is a current passing through the voltage converter in response to a driver's request, exerts switching control of the power converter so that the passing current becomes the target current, combines power output from the first power storage device and power output from the second power storage device, and supplies the combined power to the driving motor.

As in the power system, in the case where two power apparatuses are connected by a voltage converter, when the voltage converter fails, a current of an unintended direction and magnitude may flow through. Therefore, in the case where the difference between such a passing current and the target current is greater than a predetermined value, the voltage converter can be determined as failed.

However, as described afterwards with reference to FIGS. 5 and 6, in the case where used voltage ranges with respect to closed circuit voltages of two power apparatuses overlap, there is a situation in which the difference between the passing current and the target current is increased even if the voltage converter does not fail. For this reason, if the failure of the voltage converter is determined simply based on the difference between the passing current and the target current, there is a concern that the voltage converter may be erroneously determined as failed even if the voltage converter is normal.

The disclosure provides a power system capable of accurately determining failure of a voltage converter connected with two power apparatuses.

SUMMARY

A power system according to an aspect of the disclosure (e.g., the power system 1 described afterwards) includes: a high voltage circuit (the first power circuit 2 described afterwards) having a high voltage power source (e.g., the first battery B1 described afterwards); a low voltage circuit (the second power circuit 3 described afterwards) having a low voltage power source (e.g., the second battery B2 described afterwards), wherein a used voltage range of the low voltage power source with respect to a closed circuit voltage overlaps with the high voltage power source, and a static voltage of the low voltage power source is lower than the high voltage power source; a voltage converter (e.g., the voltage converter 5 described afterwards), converting a voltage between the high voltage circuit and the low voltage circuit; a power converter (e.g., the power converter 43 described afterwards), converting power between the high voltage circuit and a driving motor (e.g., the driving motor M described afterwards); a passing current obtaining section (e.g., the current sensor 33 described afterwards), obtaining a passing current which is a current flowing through the voltage converter; a passing current control section (e.g., the passing power control part 73a described afterwards), operating the voltage converter so that the passing current becomes a target current; and a failure determining section (e.g., the failure determining part 73b described afterwards), determining failure of the voltage converter based on a difference between the passing current and the target current. The failure determining section determines that the voltage converter fails in a case where the difference is greater than a predetermined value and the passing current flows from a side of the high voltage circuit to a side of the low voltage circuit.

A power system according to another aspect of the disclosure (e.g., the power system 1 described afterwards) includes: a high voltage circuit (the first power circuit 2 described afterwards) having a high voltage power source (e.g., the first battery B1 described afterwards); a low voltage circuit (the second power circuit 3 described afterwards) having a low voltage power source (e.g., the second battery B2 described afterwards), wherein a used voltage range of the low voltage power source with respect to a closed circuit voltage overlaps with the high voltage power source, and a static voltage of the low voltage power source is lower than the high voltage power source; a voltage converter (e.g., the voltage converter 5 described afterwards), converting a voltage between the high voltage circuit and the low voltage circuit; a power converter (e.g., the power converter 43 described afterwards), converting power between the high voltage circuit and a driving motor (e.g., the driving motor M described afterwards); a passing current obtaining section (e.g., the current sensor 33 described afterwards), obtaining a passing current which is a current flowing through the voltage converter; a passing current control section (e.g., the passing power control part 73a described afterwards), operating the voltage converter so that the passing current becomes a target current; and a failure determining section (e.g., the failure determining part 73b described afterwards), determining failure of the voltage converter based on a difference between the passing current and the target current. The failure determining section determines that the voltage converter fails in a case where the difference is greater than a predetermined value and the passing current is greater than the target current.

According to an embodiment of the disclosure, at least in a case where the passing current flows from the side of the low voltage circuit to the side of the high voltage circuit, the failure determining section determines that the voltage converter is normal.

According to an embodiment of the disclosure, at least in a case where the passing current is smaller than the target current, the failure determining section determines that the voltage converter is normal.

According to an embodiment of the disclosure, the failure determining section determines that the voltage converter fails in a case where the difference is greater than the predetermined value, the passing current flows from the side of the high voltage circuit to the side of the low voltage circuit, and the passing current is greater than the target current.

Figure 1:
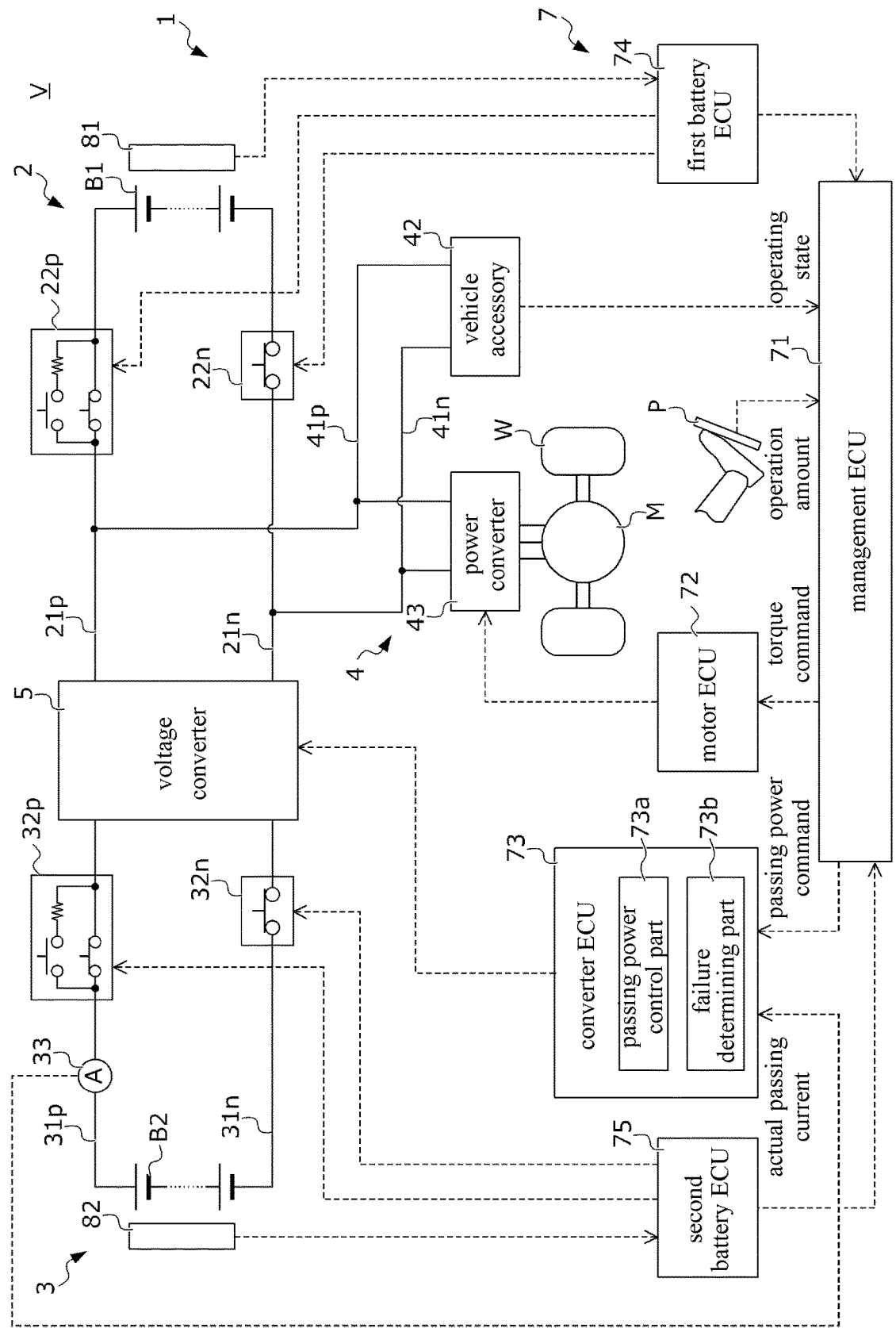
FIG. 1 is a diagram illustrating a configuration of a vehicle in which a power system according to an embodiment of the disclosure is mounted.

DESCRIPTION OF THE EMBODIMENTS (1) In the power system of the disclosure, the high voltage circuit and the low voltage circuit are connected by the voltage converter. The high voltage circuit has the high voltage power source. The low voltage circuit has the low voltage power source. The used voltage range of the low voltage power source with respect to the closed circuit voltage overlaps with the high voltage power source, and the static voltage of the low voltage power source is lower than the high voltage power source. The passing current control section operates the voltage converter so that the passing current flowing through the voltage converter becomes the target current. When the voltage converter in such power system fails, the passing current that is of an unintentional magnitude may flow from the side of the high voltage circuit to the side of the low voltage circuit. Therefore, the failure determining section determines that the voltage converter fails in the case where the difference between the passing current and the target current is greater than the predetermined value and the passing current flows from the side of the high voltage circuit to the side of the low voltage circuit. According to the disclosure, the failure of the voltage converter can be accurately determined.

(2) In the power system of the disclosure, the high voltage circuit and the low voltage circuit are connected by the voltage converter. The high voltage circuit has the high voltage power source. The low voltage circuit has the low voltage power source. The used voltage range of the low voltage power source with respect to the closed circuit voltage overlaps with the high voltage power source, and the static voltage of the low voltage power source is lower than the high voltage power source. The passing current control section operates the voltage converter so that the passing current flowing through the voltage converter becomes the target current. When the voltage converter in such power system fails, due to the potential difference between the high voltage power source and the low voltage power source, the passing current greater than the target current may flow through. Therefore, the failure determining section determines that the voltage converter fails in the case where the difference between the passing current and the target current is greater than the predetermined value and the passing current is greater than the target current. According to the disclosure, the failure of the voltage converter can be accurately determined.

(3) In the case where the output power range of the high voltage power source overlaps with the used voltage range of the low voltage power source with respect to the closed circuit voltage, the difference between the passing current and the target current may be greater than the predetermined value even if the voltage converter is normal. More specifically, in the case where the target current is set at the predetermined value in the direction from the side of the low voltage circuit to the side of the high voltage circuit, and power combining the power supplied from the low voltage power source and the power supplied from the high voltage power source is supplied to the driving motor, when the voltage drop in the high voltage power source somehow increases, the passing current flowing from the side of the low voltage circuit to the side of the high voltage circuit in the voltage converter may be greater than the target current even if the voltage converter is normal (referring to FIG. 5 described afterwards). Comparatively, in the power system of the disclosure, at least in the case where the passing current flows from the side of the low voltage circuit to the side of the high voltage circuit, even if the difference between the passing current and the target current is greater than the predetermined value, the failure determining section still determines that the voltage converter is normal. Accordingly, based on the disclosure, the erroneous determination that the voltage converter fails even though the voltage converter is normal can be avoided.

(4) In the case where the output power range of the high voltage power source overlaps with the used voltage range of the low voltage power source with respect to the closed circuit voltage, the difference between the passing current and the target current may be greater than the predetermined value even if the voltage converter is normal. More specifically, in the case where the target current is set at the predetermined value in the direction from the side of the high voltage circuit to the side of the low voltage circuit and a portion of the power output from the high voltage power source is supplied to the low voltage power source, when the closed circuit voltage of the high voltage power source and the static voltage of the low voltage power source are somehow close, the passing current flowing from the side of the high voltage circuit to the side of the low voltage circuit in the voltage converter may be smaller than the target current even if the voltage converter is normal (referring to FIG. 6 described afterwards). Comparatively, in the power system of the disclosure, at least in the case where the passing current is smaller than the target current, even if the difference between the passing current and the target current is greater than the predetermined value, the failure determining section still determines that the voltage converter is normal. Accordingly, based on the disclosure, the erroneous determination that the voltage converter fails even though the voltage converter is normal can be avoided.

(5) As described above, when the voltage converter in the power system of the disclosure fails, the passing current which is greater than the target current and the magnitude of which is responsive to the potential difference between the high voltage power source and the low voltage power source may flow through from the side of the high voltage circuit to the side of the low voltage circuit. Therefore, the failure determining section determines that the voltage converter fails in the case where the difference between the passing current and the target current is greater than the predetermined value, the passing current flows from the side of the high voltage circuit to the side of the low voltage circuit, and the passing current is greater than the target current. According to the disclosure, the failure of the voltage converter can be accurately determined.

In the following, an embodiment of the disclosure will be described with reference to the drawings. FIG. 1 is a diagram illustrating a configuration of an electric vehicle V (hereinafter simply referred to as "vehicle") in which a power system 1 according to the embodiment is mounted.

The vehicle V includes a driving wheel W, a driving motor M connected with the driving wheel W, and a power system 1 for power transfer between the driving motor M and a first battery B1 and a second battery B2 to be described afterwards. The embodiment is described with an example in which the vehicle V accelerates/decelerates mainly based on the power generated by the motor M. However, the disclosure is not limited thereto. The vehicle V may also be a so-called hybrid vehicle in which the driving motor M and an engine are mounted as power generating sources. In addition, in the embodiment, the power system 1 is described with an example of running by supplying power stored in the two batteries B1 and B2 to the driving motor M. However, the disclosure is not limited thereto. Any of the two batteries B1 and B2 which the power system 1 includes may also be a fuel cell.

The driving motor M is connected with the driving wheel W via a power transmission mechanism not shown herein. A torque generated by the driving motor M through supplying three-phase AC power from the power system 1 to the driving motor M is transmitted to the driving wheel W via the power transmission mechanism not shown herein, and the driving wheel W rotates to allow the vehicle V to travel. In addition, the driving motor M functions as a power generator to generate regenerative power when the vehicle V decelerates, and applies a regenerative braking torque responsive to the magnitude of the regenerative power to the driving wheel W. The regenerative power generated by the driving motor M properly charges the batteries B1 and B2 of the power system 1.

The power system 1 includes a first power circuit 2 having the first battery B1, a second power circuit 3 having the second battery B2, a voltage converter 5 connecting the first power circuit 2 and the second power circuit 3, a load circuit 4 having various electric loads including the driving motor M, and an electronic control unit group 7 controlling the first power circuit 2 and the second power circuit 3 and the load circuit 4 and the voltage converter 5. The electronic control unit group 7 includes a management ECU 71, a motor ECU 72, a converter ECU 73, a first battery ECU 74, and a second battery ECU 75, which are respectively computers.

The first battery B1 is a secondary battery capable of both discharging to convert chemical energy into electrical energy and charging to convert electrical energy into chemical energy. In the following, a case where a so-called lithium ion battery performing charging and discharging through movement of lithium ions between electrodes serves as the first battery B1 is described. However, the disclosure is not limited thereto.

In the first battery B1, a first battery sensor unit 81 is disposed to estimate an internal state of the first battery B1. The first battery sensor unit 81 is formed by a plurality of sensors which detect physical quantities necessary for obtaining the charging rate (which represents battery power storage in percentage), temperature, etc., of the first battery B1 in the first battery ECU 74, and transmit signals responsive to the detected values to the first battery ECU 74. More specifically, the first battery sensor unit 81 is formed by a voltage sensor detecting a terminal voltage of the first battery B1, a current sensor detecting a current flowing through the first battery B1, and a temperature sensor detecting a temperature of the first battery B1, etc.

The second battery B2 is a secondary battery capable of both discharging to convert chemical energy into electrical energy and charging to convert electrical energy into chemical energy. In the following, a case where a so-called lithium ion battery performing charging and discharging through movement of lithium ions between electrodes serves as the second battery B2 is described. However, the disclosure is not limited thereto. A capacitor, for example, may also be used as the second battery B2.

In the second battery B2, a second battery sensor unit 82 is disposed to estimate an internal state of the second battery B2. The second battery sensor unit 82 is formed by a plurality of sensors which detect physical quantities necessary for obtaining the charging rate, temperature, etc., of the second battery B2 in the second battery ECU 75 and transmit signals responsive to the detected values to the second battery ECU 75. More specifically, the second battery sensor unit 82 is formed by a voltage sensor detecting a terminal voltage of the second battery B2, a current sensor detecting a current flowing through the second battery B2, and a temperature sensor detecting a temperature of the second battery B2, etc.

Here, the characteristics of the first battery B1 and the characteristics of the second battery B2 are compared. Compared with the second battery B2, the first battery B1 has a lower output weight density and a higher energy weight density. In addition, the first battery B1 has a greater capacity than the second batter B2. In other words, the first battery B1 is excellent over the second battery B2 in terms of energy weight density. The energy weight density refers to electric energy per unit weight [Wh/kg], and the output weight density refers to electric power per unit weight [W/kg]. Therefore, the first battery B1 whose energy weight density is excellent is a capacity-type power storage device whose main purpose is to provide a high capacity, and the second battery B2 whose output weight density is excellent is an output-type power storage device whose main purpose is to provide a high output. Therefore, in the power system 1, the first battery B1 is used as main power source, and the second battery B2 is used as an auxiliary power source that supplements the first battery B1.

FIGS. 2A and 2B are diagrams comparing used voltage ranges of the first battery B1 and the second battery B2 in the power system 1. FIG. 2A shows the used voltage range of the first battery B1, and FIG. 2B shows the used voltage range of the second battery B2. In FIGS. 2A and 2B, the horizontal axis represents the current flowing through the battery, and the vertical axis represents the voltage of the battery.

Figure 2:
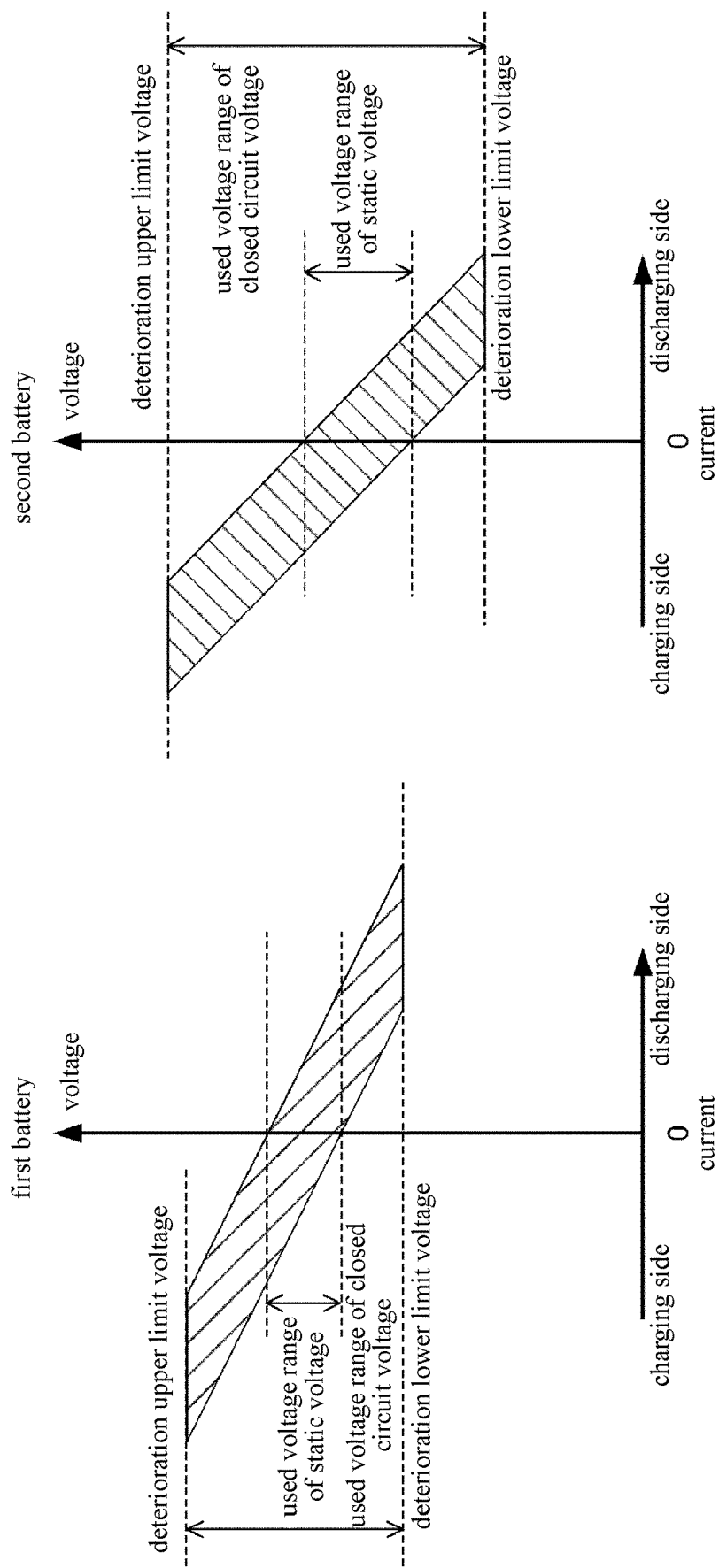
FIGS. 2A and 2B are diagrams comparing used voltage ranges of a first battery and a second battery.

As shown in FIGS. 2A and 2 B, the static voltages of the batteries B1 and B2 (i.e., voltages in a state in which currents do not flow through the batteries, such voltages may also be referred to as open circuit voltages) exhibit the characteristic of increasing as the charging rate increases. Therefore, the upper limits of the used voltage ranges of the batteries B1 and B2 with respect to the static voltages are the respective static voltages when the charging rate is at the maximum (e.g., 100%), and the lower limits thereof are the respective static voltages when the charging rate is at the minimum (e.g., 0%). As shown in FIGS. 2A and 2B, the upper limit of the used voltage range of the second battery B2 with respect to the static voltage is lower than the upper limit of the used voltage range of the first battery B1 with respect to the static voltage. Therefore, when the vehicle V is traveling, the static voltage of the second battery B2 is basically maintained lower than the static voltage of the first battery B1.

As shown in FIGS. 2A and 2B, the closed circuit voltages of the batteries B1 and B2 (i.e., voltages in a state in which currents flow into the batteries) also exhibit the characteristic of increasing as the charging rate increases. In addition, due to presence of internal resistances in the batteries B1 and B2, the closed circuit voltages exhibit the characteristics of decreasing from the static voltage as the discharging current increases and increasing from the static voltage as the charging current increases. Therefore, the upper limits of the used voltage ranges of the batteries B1 and B2 with respect to the closed circuit voltages are higher than the upper limits of the respective used voltage ranges thereof with respect to the static voltages, and the lower limits thereof are lower than the lower limits of the used voltage ranges of the respective static voltages. In other words, the used voltage ranges of the batteries B1 and B2 with respect to the closed circuit voltages include the respective used voltage ranges with respect to the static voltages. As shown in FIG. 2, the used voltage range of the first battery B1 with respect to the closed circuit voltage overlaps with the used voltage range of the second battery B2 with respect to the closed circuit voltage.

In addition, since the deterioration of the batteries B1 and B2 is facilitated when the charging current becomes excessively large, the upper limits of the used voltage ranges of the batteries B1 and B2 with respect to the closed circuit voltage are determined so as not to deteriorate the batteries B1 and B2. In the following, the upper limits of the used ranges of the closed circuit voltages of the batteries B1 and B2 are also referred to as deterioration upper limit voltages.

In addition, since the deterioration of the batteries B1 and B2 is facilitated when the discharging current becomes excessively large, the lower limits of the used voltage ranges of the batteries B1 and B2 with respect to the closed circuit voltage are determined so as not to deteriorate the batteries B1 and B2. In the following, the lower limits of the used voltage ranges of the batteries B1 and B2 with respect to the closed circuit voltages are also referred to as deterioration lower limit voltages.

Referring to FIG. 1 again, the first power circuit 2 includes the first battery B1, first power lines 21p and 21n connecting positive and negative electrodes of the first battery B1 and a positive electrode terminal and a negative electrode terminal of a high voltage side of the voltage converter 5, and a positive electrode contactor 22p and a negative electrode contactor 22n provided at the first power lines 21p and 21n.

The contactors 22p and 22n are of a normal-open type that are opened in a state in which a command signal from the outside is not input, so as to cut off conduction between the two electrodes of the first battery B1, and the first power lines 21p and 21n, and are closed in a state in which the command signal is input, so as to connect the first battery B1 and the first power lines 21p and 21n. The contactors 22p and 22n are opened and closed responsive to a command signal transmitted from the first battery ECU 74. The positive electrode contactor 22p is configured as a pre-charge contactor having a precharge resistance for smoothing a rush current to a plurality of smoothing capacitors disposed in the first power circuit 2 or the load circuit 4, etc.

The second power circuit 3 includes the second battery B2, second power lines 31p and 31n connecting positive and negative electrodes of the second battery B2 and a positive electrode terminal and a negative electrode terminal of a low voltage side of the voltage converter 5, a positive electrode contactor 32p and a negative electrode contactor 32n provided at the second power lines 31p and 31n, and a current sensor 33 provided at the second power line 31p.

The contactors 32p and 32n are of a normal-open type that are opened in a state in which a command signal from the outside is not input, so as to cut off conduction between the two electrodes of the second battery B2 and the second power lines 31p and 31n, and are closed in a state in which the command signal is input, so as to connect the second battery B2 and the second power lines 31p and 31n. The contactors 32p and 32n are opened and closed responsive to a command signal transmitted from the second battery ECU 75. The positive electrode contactor 32p is configured as a pre-charge contactor having a precharge resistance for smoothing a rush current to a plurality of smoothing capacitors disposed in the first power circuit 2 or the load circuit 4, etc.

The current sensor 33 transmits a detection signal responsive to a passing current, which is a current flowing through the second power line 31p, i.e., a current flowing through the voltage converter 5, to the converter ECU 73. Regarding the direction of the passing current in the embodiment, the direction from the side of the second power circuit 3 toward the side of the first power circuit 2 is set as positive, and the direction from the side of the first power circuit 2 toward the side of the second power circuit 3 is negative.

The load circuit 4 includes a vehicle accessory 42, a power converter 43 connected with the driving motor M, and load power lines 41p and 41n connecting the vehicle accessory 42 and the power converter 43 with the first power circuit 2.

The vehicle accessory 42 is formed by a plurality of electrical loads such as a battery heater, an air compressor, a DC-DC converter, and a car charger, etc. The vehicle accessory 42 is connected with the first power lines 21p and 21n of the first power circuit 2 through the load power lines 41p and 41n, and operates by consuming the power in the first power line 21p and 21n. Information relating to operating states of the various electrical loads forming the vehicle accessory 42 is transmitted to the management ECU 71, for example.

The power converter 43 is connected with the first power lines 21p and 21n to be parallel to the vehicle accessory 42 through the load power lines 41p and 41n. The power converter 43 converts power between the first power lines 21p and 21n and the driving motor M. The power converter 43, for example, includes a bridge circuit formed by bridge-connecting a plurality of switching elements (e.g., IGBT), is a PWM inverter with pulse width modulation, and includes a function of converting between DC power and AC power. The power converter 43 is connected with the first power lines 21p and 21n on DC input/output sides, and is connected with respective coils of a U phase, a V phase, and a W phase of the driving motor M on AC input/output sides. The power converter 43 converts DC power in the first power lines 21p and 21n into three-phase AC power and supplies the three-phase AC power to the driving motor and converts three-phase AC power supplied from the driving motor into DC power or converts three-phase AC power supplied by the driving motor M into DC power and supplies the DC power to the first power lines 21p and 21n by on/off driving the switching elements of the respective phases in accordance with a gate driving signal generated at a predetermined timing from a gate drive circuit (not shown) of the motor ECU 72.

The voltage converter 5 connects the first power circuit 2 and the second power circuit 3, and converts a voltage between the first power circuit 2 and the second power circuit 3. A conventional booster circuit may be used as the voltage converter 5.

Figure 3:
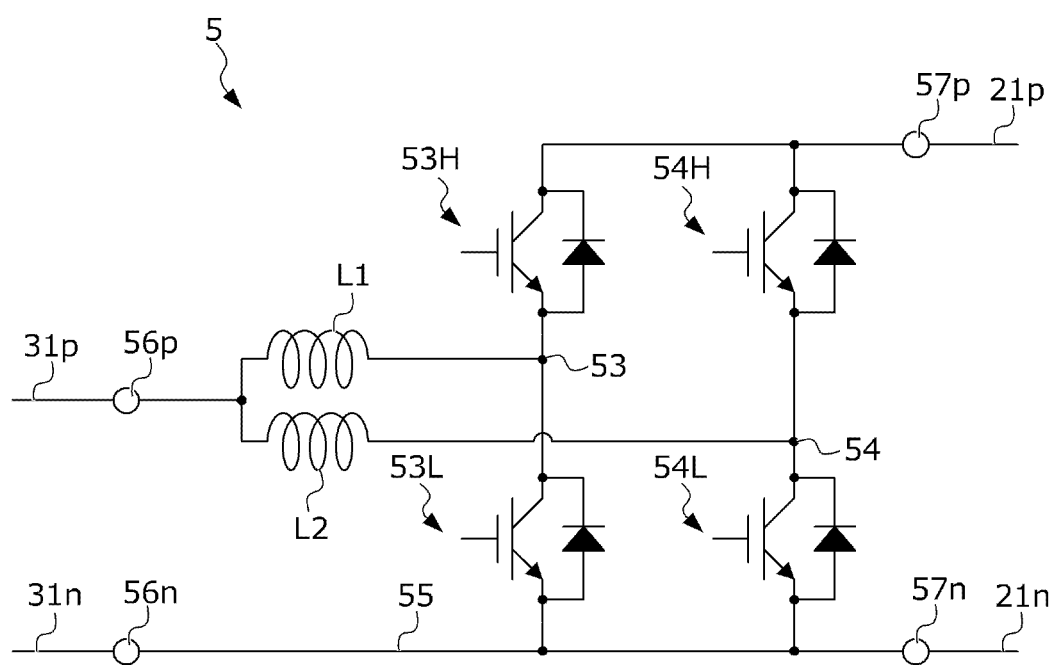
FIG. 3 is a diagram illustrating an example of a circuit configuration of a voltage converter.

FIG. 3 is a diagram illustrating an example of a circuit configuration of the voltage converter 5. The voltage converter 5 connects the first power lines 21p and 21n connected with the first battery B1 and the second power lines 31p and 31n connected with the second battery B2, and converts a voltage between the first power lines 21p and 21n and the second power lines 31p and 31n. The voltage converter 5 is a full-bridge type DC-DC converter formed by assembling a first reactor L1, a second reactor L2, a first high-arm element 53H, a first low-arm element 53L, a second high-arm element 54H, a second low-arm element 54L, a negative busbar 55, low voltage side terminals 56p and 56n, high voltage side terminals 57p and 57n, and a smoothing capacitor (not shown).

The low voltage side terminals 56p and 56n are connected with the second power lines 31p and 31n, and the high voltage side terminals 57p and 57n are connected with the first power lines 21p and 21n. The negative busbar 55 is a wiring connecting the low voltage side terminal 56n and the high voltage side terminal 57n.

One end side of the first reactor L1 is connected with the low voltage side terminal 56p, and the other end side thereof is connected with a connection node 53 between the first high-arm element 53H and the first low-arm element 53L. The first high-arm element 53H and the first low-arm element 53L each include a conventional power switching element such as an IGBT or a MOSFET, etc., and a freewheel diode connected with the power switching element. The high-arm element 53H and the low-arm element 53L are connected in series in this order between the high voltage side terminal 57P and the negative busbar 55.

The collector of the power switching element of the first high-arm element 53H is connected with the high voltage side terminal 57p, and the emitter thereof is connected with the collector of the first low-arm element 53L. The emitter of the power switching element of the first low-arm element 53 is connected with the negative busbar 55. The forward direction of the freewheel diode provided at the first high-arm element 53H is a direction from the first reactor L1 toward the high voltage side terminal 57p. In addition, the forward direction of the freewheel diode provided at the first low-arm element 53L is a direction from the negative busbar 55 toward the first reactor L1.

One end side of the second reactor L2 is connected with the low voltage side terminal 56p, and the other end side thereof is connected with a connection node 54 between the second high-arm element 54H and the second low-arm element 54L. The second high-arm element 54H and the second low-arm element 54L each include a conventional power switching element such as an IGBT or a MOSFET, etc., and a freewheel diode connected with the power switching element. The high-arm element 54H and the low-arm element 54L are connected in series in this order between the high voltage side terminal 57P and the negative busbar 55.

The collector of the power switching element of the second high-arm element 54H is connected with the high voltage side terminal 57p, and the emitter thereof is connected with the collector of the second low-arm element 54. The emitter of the power switching element of the second low-arm element 54L is connected with the negative busbar 55. The forward direction of the freewheel diode provided at the second high-arm element 54 is a direction from the second reactor L2 toward the high voltage side terminal 57p. In addition, the forward direction of the freewheel diode provided at the second first low-arm element 54L is a direction from the negative busbar 55 toward the second reactor L2.

The voltage converter 5 converts a voltage between the first power lines 21p and 21n and the second power lines 31p and 31n through alternate on/off driving the first high-arm element 53H as well as the second low-arm element 54L and the first low-arm element 53L as well the second high-arm element 54H in accordance with a gate driving signal generated at a predetermined timing from a gate drive circuit (not shown) of the converter ECU 73.

As described with reference to FIGS. 2A and 2B, when the vehicle V is traveling, the static voltage of the second battery B2 is basically maintained lower than the static voltage of the first battery B1. Accordingly, the voltages of the first power lines 21p and 21n are basically higher than the voltages of the second power lines 31p and 31n. Therefore, in the case where the power output from the first battery B1 and the power output from the second battery B2 are both used to drive the driving motor M, the converter ECU operates the voltage converter 5 so as to exert a booster function in the voltage converter 5. The booster function refers to a function to boost power in the second power lines 31p and 31n connected with the low voltage side terminals 56p and 56n to output the boosted power to the first power lines 21p and 21n connected with the high voltage side terminals 57p and 57n, thereby making a positive passing current flow from the side of the second power lines 31p and 31n to the side of the first power lines 21p and 21n. In addition, in the case where discharging of the second battery B2 is suppressed and the driving motor M is driven only by the power output by the first battery B1, the converter ECU 73 turns off the voltage converter 5, so that the current does not flow from the first power lines 21p and 21n to the second power lines 31p and 31n. However, under such circumstance, in the case where the voltages of the second power lines 31p and 31n exceed the voltages of the first power lines 21p and 21n, there is a situation where the second battery B2 starts to discharge, and the positive flowing circuit flows from the second power lines 31p and 31n to the first power lines 21p and 21n via the freewheel diodes of the high-arm elements 53H and 54H.

In addition, in the case where the first battery B1 or the second battery B2 is charged with the regenerative power output from the driving motor M to the first power lines 21p and 21n during deceleration, the converter ECU 73 operates the voltage converter 5 so as to exert a buck function in the voltage converter 5. The buck function refers to a function to buck power in the first power lines 21p and 21n connected with the high voltage side terminals 57p and 57n to output the bucked power to the second power lines 31p and 31n connected with the low voltage side terminals 56p and 56n, thereby making a negative passing current flow from the side of the first power lines 21p and 21n to the side of the second power lines 31p and 31n.

Referring to FIG. 1 again, the first battery ECU 74 is a computer mainly responsible for monitoring the state of the first battery B1 and for on/off operation of the contactors 22p and 22n of the first power circuit 2. The first battery ECU 74 calculates various parameters representing the internal state of the first battery B1, more specifically, the temperature of the first battery B1, the internal resistance of the first battery B1, the static voltage of the first battery B1, the closed circuit voltage of the first battery B1, and the charging rate of the first battery B1, etc., based on the conventional algorithms using the detected values transmitted from the first battery sensor unit 81. The information relating to the parameters representing the internal state of the first battery B1 obtained in the first battery ECU 74 is, for example, transmitted to the management ECU 71.

The second battery ECU 75 is a computer mainly responsible for monitoring the state of the second battery B2 and for on/off operation of the contactors 32p and 32n of the second power circuit 3. The second battery ECU 75 calculates various parameters representing the internal state of the second battery B2, more specifically, the temperature of the second battery B2, the internal resistance of the second battery B2, the static voltage of the second battery B2, the closed circuit voltage of the second battery B2, and the charging rate of the second battery B2, etc., based on the conventional algorithms using the detected values transmitted from the second battery sensor unit 82. The information relating to the parameters representing the internal state of the second battery B2 obtained in the second battery ECU 75 is, for example, transmitted to the management ECU 71.

The management ECU 71 is a computer mainly managing power flow in the entire power system 1. The management ECU 71 generates a torque command signal equivalent to a command with respect to a torque generated by the driving motor M and a passing power command signal equivalent to a command equivalent to a command with respect to power passing through the voltage converter 5 according to an order in the following.

The management ECU 71 calculates a required driving torque by a driver based on an operation amount of a pedal type P, such as an accelerator pedal or a brake pedal, etc., by the driver, and transmits the torque command signal responsive to the required driving torque to the motor ECU 72.

The management ECU 71 calculates the total required power, which is the power required in the entire load circuit 4, by adding up the required accessory power, which is the power required in the vehicle accessory 42, and the required driving power, which is the power required in the driving motor M. Here, the required accessory power is calculated in the management ECU 71 based on the information relating to the operating states of the various electrical loads transmitted from the vehicle accessory 42. In addition, the required driving power is calculated in the management ECU 71 by converting the required driving torque into electrical power.

The management ECU 71 calculates a second load rate, which is equivalent to a proportion of the power output from the second battery B2 with respect to the total required power by using the information relating to the internal state of the first battery B1 transmitted from the first battery ECU 74, the information relating to the internal state of the second battery B2 transmitted from the second battery ECU 75, and the required driving power. In addition, the management ECU 71 calculates a second target power, which is a target with respect to the power output from the second battery B2, by multiplying the second load rate calculated above by the total required power, and transmits the passing power command signal responsive to the second target power to the converter ECU 73.

The motor ECU 72 is a computer mainly managing power flow from the first power circuit 2 to the driving motor M. The motor ECU 72 operates the power converter 43 based on the torque command signal transmitted from the management ECU 71, so as to generate a torque responsive to the command in the driving motor M. Accordingly, power responsive to the required driving power is supplied from the first power circuit 2 to the driving motor M.

The converter ECU 73 is a computer formed by a passing power control part 73a, which is a control module responsible for managing power passing through the voltage converter 5, and a failure determining part 73b, which is a control module determining a failure of the voltage converter 5.

The passing power control part 73a operates the voltage converter 5 responsive to the passing power command signal transmitted from the management ECU 71, so that passing power responsive to the command passes through the voltage converter 5. More specifically, the passing power control part 73a calculates a target current, which is a target with respect to the passing current in the voltage converter 5, based on the passing power command signal, and operates the voltage converter 5 in accordance with a conventional feedback control algorithm, so that the passing current detected by the current sensor 33 (referred to as "actual passing current" in the following) becomes the target current. Accordingly, power responsive to the second target power is output from the second battery B2 to the first power circuit 2. The insufficient portion between the total required power and the second target power is output from the first battery B1.

The failure determining part 73b determines the failure of the voltage converter 5 based on a difference between the passing current detected by the current sensor 33 and the target current calculated through the feedback control in the passing power control part 73a.

Figure 4:
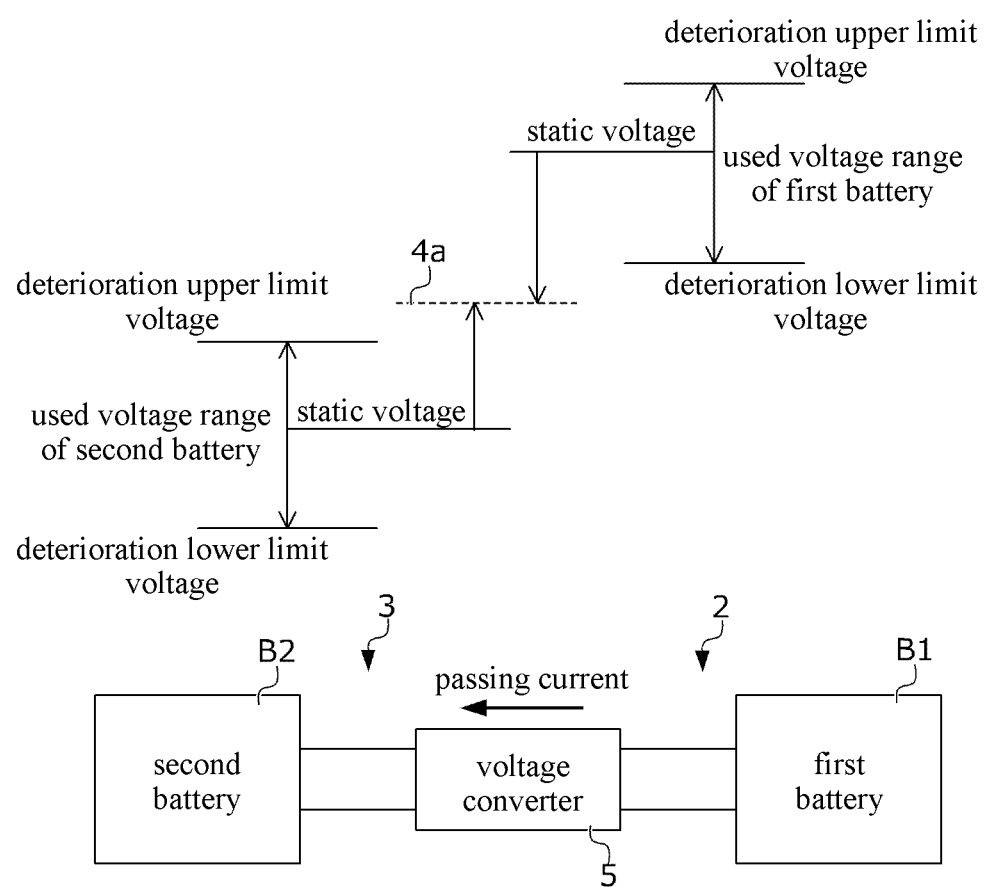
FIG. 4 is a schematic diagram illustrating changes of voltages of the first battery and the second battery in the case where a voltage converter fails.

FIG. 4 is a schematic diagram illustrating changes of the voltages of the first battery B1 and the second battery B2 in the case where the voltage converter 5 fails. In the following, the case where the voltage converter 5 fails in a state, for example, in which the target current is set at 0, and charging and discharging of the second battery B2 is suspended is described as an example. Also, in the following, the failure of the voltage converter 5 refers to the case where at least one of the high-arm elements 53H and 54H has an on-failure.

As described with reference to FIG. 3, since the freewheel diodes setting the direction from the side of the second power circuit 3 toward the first power circuit 2 as the forward direction are provided in the high-arm elements 53H and 54H of the voltage converter 5, in the case where the voltage converter 5 does not fail, even if the voltage on the side of the first power circuit 2 is higher than the voltage on the side of the second power circuit 3, the current does not flow from the side of the first power circuit 2 to the side of the second power circuit 3.

Comparatively, when at least one of the high-arm elements 53H and 54H of the voltage converter 5 has an on-failure in a state where the voltage on the side of the first power circuit 2 is higher than the voltage on the side of the second power circuit 3, the negative passing current whose magnitude is responsive to the potential difference between the first power circuit 2 and the second power circuit 3 flows through, as shown in the lower part of FIG. 4. When such a negative passing current flows through, as represented in a broken line 4a in the upper part of FIG. 4, the closed circuit voltage of the first battery B1 decreases significantly from the static voltage and may be lower than the deterioration lower limit voltage. In addition, the closed circuit voltage of the second battery B2 may significantly rise and be higher than the deterioration upper limit voltage. That is, when the voltage converter 5 fails, a significant divergence between the target current and the actual passing current still occurs even under the control of the power control part 73a. Therefore, the failure determining part 73b determines failure of the voltage converter 5 based on the difference between the target current and the passing current.

However, as will be then described with reference to FIGS. 5 and 6, in the case where the used voltage ranges with respect to the closed circuit voltages in the first battery B1 and the second battery B2 overlap, there is a situation in which a significant divergence between the target current and the passing current occurs even if the voltage converter 5 is normal.

Figure 5:
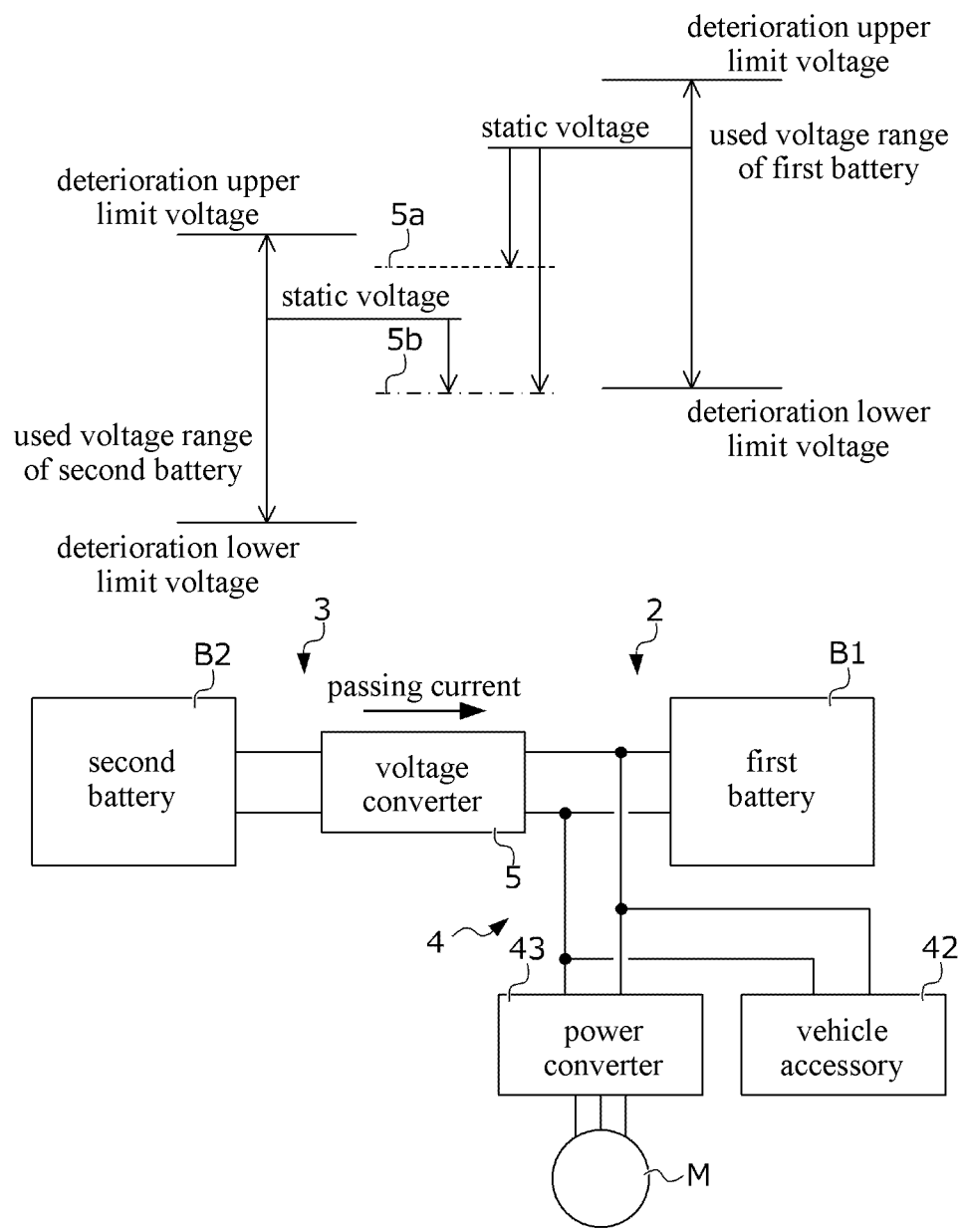
FIG. 5 is a schematic diagram illustrating a first example in which a significant divergence between a target current and a passing current is generated even though the voltage converter is normal.

FIG. 5 is a schematic diagram illustrating a first example in which a significant divergence between the target current and the passing current is generated even though the voltage converter 5 is normal. In the example of FIG. 5, a case where the target current is set at 0, and the power required by the driving motor M and the vehicle accessory 42 is supplied only by the power output from the first battery B1 is illustrated. In FIG. 5, the closed circuit voltage of the first battery B1 in the case where the internal resistance of the first battery B1 is in a standard state is represented in a broken line 5a, and the closed circuit voltage of the first battery B1 in the case where the internal resistance of the first battery B1 is somehow increased from the standard state is represented in a dash-dot line 5b. The reasons why the internal resistance of the first battery B1 is increased from the standard state includes, for example, that the first battery B1 is at a low temperature, the first battery B1 is deteriorated, the charging rate of the first battery B1 is decreased, etc.

As shown in the broken line 5a, in the case where the internal resistance of the first battery B1 is in the standard state, even if the power required in the driving motor M and the vehicle accessory 42 is output from the first battery B1, the closed circuit voltage of the first battery B1 does not go lower than the static voltage of the second battery B2. Therefore, in the example represented by the broken line 5a, since power is not output from the second battery B2, the actual passing current is 0, which is consistent with the target current.

Comparatively, as shown in the dash-dot line 5b, in the state in which the internal resistance of the first battery B1 is increased from the standard state, since voltage drop of the first battery B1 increases, when power required in the driving motor M and the vehicle accessory 42 is to be output, the closed circuit voltage of the first battery B1 may be lower than the static voltage of the second battery B2. Therefore, in the example represented by the dash-dot line 5b, as shown in the lower part of FIG. 5, power may be output from the second battery B2 unintentionally, and the actual passing current may be diverged from the target current even if the voltage converter 5 is normal.

Figure 6:
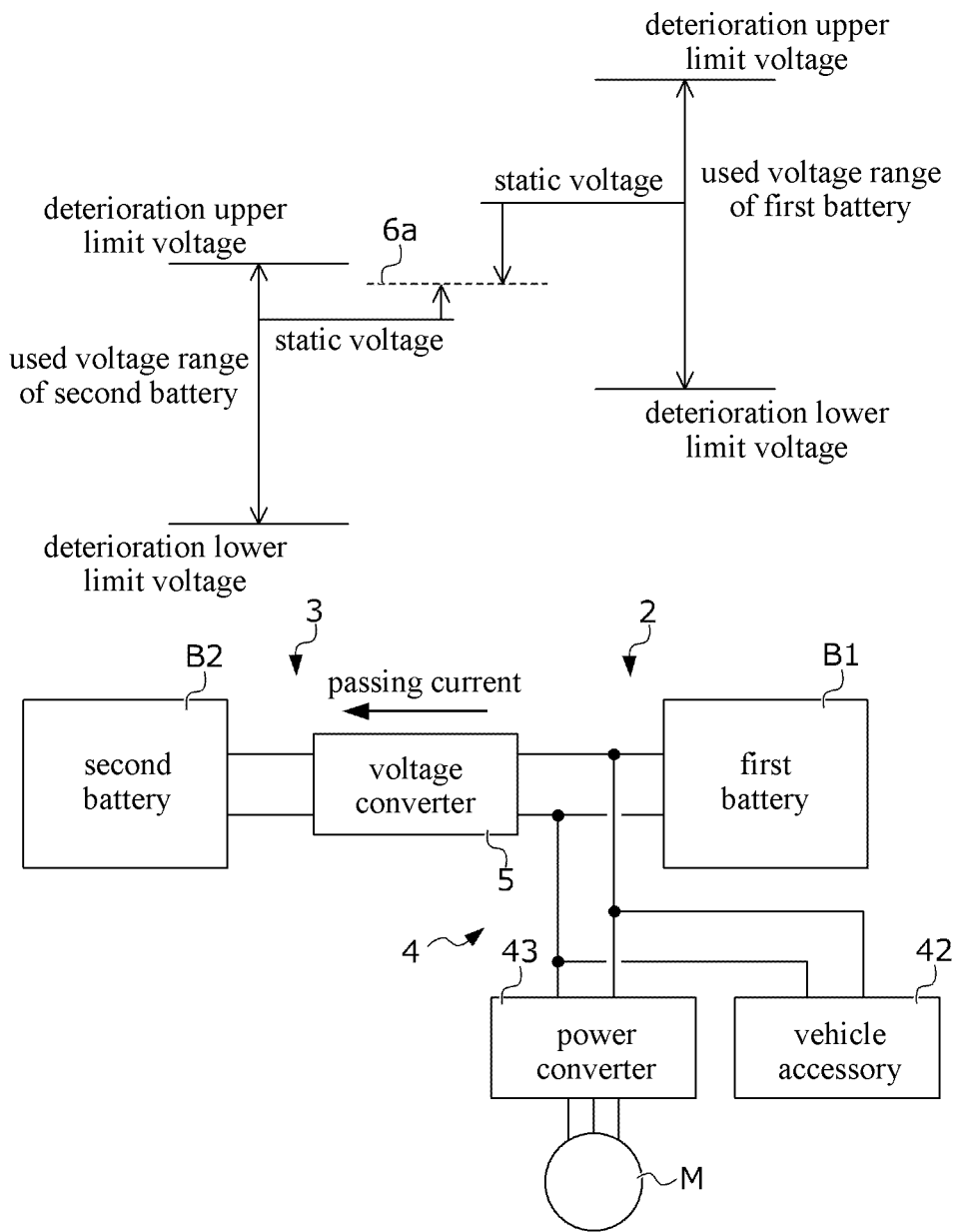
FIG. 6 is a schematic diagram illustrating a second example in which a significant divergence between the target current and the passing current is generated even though the voltage converter is normal.

FIG. 6 is a schematic diagram illustrating a second example in which a significant divergence between the target current and the passing current is generated even though the voltage converter 5 is normal. In the example of FIG. 6, a case where the target current is set at a negative predetermined value, and at least a portion of the power output from the first battery B1 is supplied to the second battery B2 to charge the second battery B2 is illustrated. In addition, a case where the closed circuit voltage of the first battery B1 represented by a broken line 6a is close to the static voltage of the second battery B2 is shown in FIG. 6. Here, the reasons why the closed circuit voltage of the first battery B1 is close to the static voltage of the second battery B2 include, for example, that the internal resistance of the first battery B1 is increased from the standard state, as described above, the charging rate of the first battery B1 is insufficient, the current flowing through the first battery is large and the voltage drop thereof is significant, or the charging rate of the second battery B2 is sufficient, etc.

As shown in FIG. 6, when power is output from the first battery B1 and a portion of the power is supplied to the side of the second power circuit 3, the closed circuit voltage of the first battery B1 decreases from the static voltage to the level represented by the broken line 6a, and the closed circuit voltage of the second battery B2 rises from the static voltage to the level represented by the broken line 6a. That is, the closed circuit voltage of the second battery B2 when the second battery B2 is being charged is latched with the closed circuit voltage of the first battery B1 as the upper limit. Therefore, when the closed circuit voltage of the first battery B1 is close to the static voltage of the second battery B2, since the closed circuit voltage of the second battery B2 is unable to rise sufficiently and the passing current is limited, the actual passing current may be diverged from the target current even if the voltage converter 5 is normal.

As described above with reference to FIGS. 5 and 6, in the power system 1 according to the embodiment, there may be a divergence between the target current and the actual passing current even if the voltage converter 5 is normal.

Figure 7:
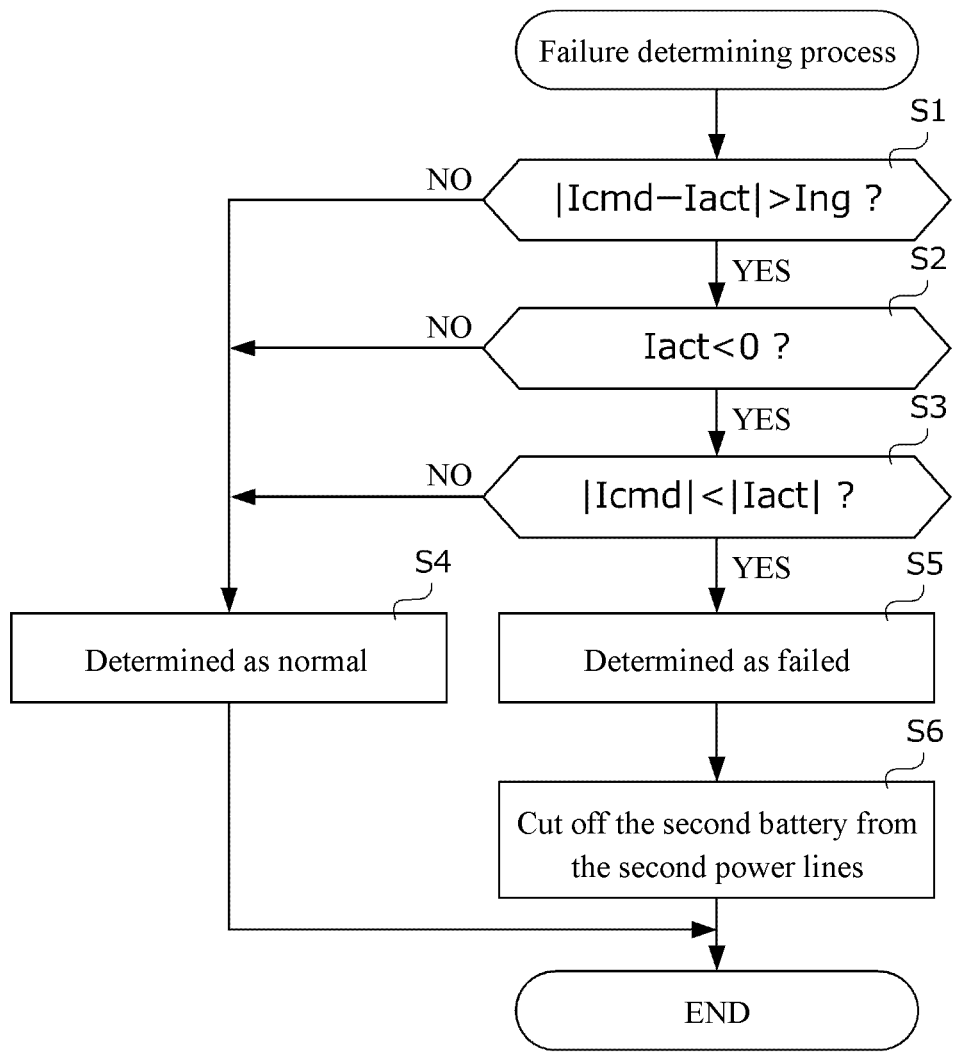
FIG. 7 is a flowchart illustrating specific steps of a failure determining process of the voltage converter in a failure determining part.

FIG. 7 is a flowchart illustrating specific steps of a failure determining process of the voltage converter 5 in the failure determining part 73b. The failure determining process shown in FIG. 7 is repetitively executed at a predetermined period during the feedback control of the passing current performed by the power control part 73a until a failure of the power converter 5 is determined. The failure determining process of FIG. 7 is executed repetitively at a predetermined period in the failure determining part 73b. In the following, the target current is represented as "Icmd", and the actual passing current is represented as "Iact".

Firstly, at S1, the failure determining part 73b determines whether the absolute value of a difference between the target current Icmd and the actual passing current Iact is greater than a predetermined positive threshold Ing (|Icmd−Iact|>Ing?). Considering detection errors of the current sensor 33, control errors of the passing power control part 73a, etc., the threshold Ing is set at a positive value slightly greater than 0. In the case where the determination result of S1 is NO, the failure determining part 73b determines that the voltage converter 5 does not fail, that is, the voltage converter 5 is normal (referring to S4), and the failure determining process of FIG. 7 ends. In the case where the determination result of S1 is YES, that is, in the case where the voltage converter 5 may possibly fail, the failure determining part 73b proceed to the process of S2.

At S2, the failure determining part 73b determines whether the actual passing current Iact is negative, that is, whether the passing current flows through the voltage converter 5 from the side of the first power circuit 2 to the side of the second power circuit 3. The determination of S2 is a process for avoiding the second example of erroneously determining the failure of the voltage converter 5 as described with reference to FIG. 6.

In the case where the determination result of S2 is NO, the failure determining part 73b determines that the voltage converter 5 is normal (referring to S4), and the failure determining process of FIG. 7 ends. That is, at least in the case where the passing current flows from the side of the second power circuit 3 to the side of the first power circuit 2, the failure determining part 73b determines that the voltage converter 5 is normal even in the situation where the absolute value of the difference between the target current Icmd and the actual passing current Iact is greater than the threshold Ing. In the case where the determination result of S2 is YES, that is, in the case where the actual passing current Iact is negative, the failure determining part 73b proceeds to the process of S3.

At S3, the failure determining part 73b determines whether the absolute value of the actual passing current Iact is greater than the absolute value of the target current Icmd, that is, whether the actual passing current Iact larger than the target current Icmd toward the negative side flows through the voltage converter 5. The determination of S3 is a process for avoiding the first example of erroneously determining the failure of the voltage converter 5 as described with reference to FIG. 5.

In the case where the determination result of S3 is NO, the failure determining part 73b determines that the voltage converter 5 is normal (referring to S4), and the failure determining process of FIG. 7 ends. That is, at least in the case where the actual passing current Iact is less significantly toward the negative side than the target current Icmd, the failure determining part 73b determines that the voltage converter 5 is normal even in the situation where the absolute value of the difference between the target current Icmd and the actual passing current Iact is greater than the threshold Ing.

In the case where the determination result of S3 is YES, that is, in the case where the absolute value of the difference between the target current Icmd and the actual passing current Iact is greater than the threshold Ing, the actual passing current Iact flows from the side of the first power circuit 2 to the side of the second power circuit 3, and the actual passing current Iact is larger than the target current Icmd toward the negative side, the failure determining part 73b determines that the voltage converter 5 fails (referring to S5). In addition, in the case of determining that the voltage converter 5 fails, the failure determining part 73b cuts off the second battery B2 from the second power lines 31p and 31n (referring to S6) to prevent an excessive charging current from flowing through the second battery B2 to deteriorate the second battery B2. More specifically, the failure determining part 73b transmits a command signal to the second battery ECU 75, and the second battery ECU 75 opens the contactors 32p and 32n of the second power circuit 3.

The power system 1 according to the above achieves the following effects. (1) In the power system 1, the failure determining part 73b of the converter ECU 73 determines that the voltage converter 5 fails in the case where the absolute value of the difference between the actual passing current Iact and the target current Icmd is greater than the predetermined threshold Ing and the passing current flows from the side of the first power circuit 2 to the side of the second power circuit 3. Accordingly, with the power system 1, the failure of the voltage converter 5 can be accurately determined.

(2) In the power system 1, the failure determining part 73b determines that the voltage converter 5 fails in the case where the difference between the actual passing current Iact and the target current Icmd is greater than the threshold Ing and the actual passing current Iact is larger than the target current Icmd toward the negative side. Accordingly, with the power system 1, the failure of the voltage converter 5 can be accurately determined.

(3) In the power system 1, at least in the case where the actual passing current Iact flows from the side of the second power circuit 3 to the side of the first power circuit 2, even if the absolute value of the difference between the actual passing current Iact and the target current Icmd is greater than the threshold Ing, the failure determining part 73b still determines that the voltage converter 5 is normal. Accordingly, with the power system 1, the erroneous determination that the voltage converter 5 fails even though the voltage converter 5 is normal can be avoided.

(4) In the power system 1, at least in the case where the actual passing current Iact is smaller than the target current Icmd, even if the absolute value of the difference between the actual passing current Iact and the target current Icmd is greater than the threshold Ing, the failure determining part 73b still determines that the voltage converter 5 is normal. Accordingly, with the power system 1, the erroneous determination that the voltage converter 5 fails even though the voltage converter 5 is normal can be avoided.

(5) In the case where the difference between the actual passing current Iact and the target current Icmd is greater than the threshold Ing, the actual passing current Iact flows from the side of the first power circuit 2 to the side of the second power circuit 3, and the actual passing current Iact is larger than the target current Icmd toward the negative side, the failure determining part 73b determines that the voltage converter 5 fails. Accordingly, with the power system 1, the failure of the voltage converter 5 can be accurately determined.

An embodiment of the disclosure has been described above. However, the disclosure is not limited thereto. Within the scope of the gist of the disclosure, the detailed configuration may be changed as appropriate.

What is claimed is:

1. A power system, comprising:
   a high voltage circuit, having a high voltage power source;
   a low voltage circuit, having a low voltage power source, wherein a used voltage range of the low voltage power source with respect to a closed circuit voltage overlaps with the high voltage power source, and a static voltage of the low voltage power source is lower than the high voltage power source;
   a voltage converter, converting a voltage between the high voltage circuit and the low voltage circuit;
   a power converter, converting power between the high voltage circuit and a driving motor;

a passing current obtaining section, obtaining a passing current which is a current flowing through the voltage converter;
a passing current control section, operating the voltage converter so that the passing current becomes a target current; and
a failure determining section, determining failure of the voltage converter based on a difference between the passing current and the target current,
wherein the failure determining section determines that the voltage converter fails in a case where the difference is greater than a predetermined value and the passing current flows from a side of the high voltage circuit to a side of the low voltage circuit.

2. The power system as claimed in claim 1, comprising:
wherein at least in a case where the passing current flows from the side of the low voltage circuit to the side of the high voltage circuit, the failure determining section determines that the voltage converter is normal.

3. The power system as claimed in claim 2, comprising:
wherein at least in a case where the passing current is smaller than the target current, the failure determining section determines that the voltage converter is normal.

4. The power system as claimed in claim 3, comprising:
wherein the failure determining section determines that the voltage converter fails in a case where the difference is greater than the predetermined value, the passing current flows from the side of the high voltage circuit to the side of the low voltage circuit, and the passing current is greater than the target current.

5. The power system as claimed claim 2, comprising:
wherein the failure determining section determines that the voltage converter fails in a case where the difference is greater than the predetermined value, the passing current flows from the side of the high voltage circuit to the side of the low voltage circuit, and the passing current is greater than the target current.

6. The power system as claimed in claim 1, comprising:
wherein at least in a case where the passing current is smaller than the target current, the failure determining section determines that the voltage converter is normal.

7. The power system as claimed in claim 6, comprising:
wherein the failure determining section determines that the voltage converter fails in a case where the difference is greater than the predetermined value, the passing current flows from the side of the high voltage circuit to the side of the low voltage circuit, and the passing current is greater than the target current.

8. The power system as claimed in claim 1, comprising:
wherein the failure determining section determines that the voltage converter fails in a case where the difference is greater than the predetermined value, the passing current flows from the side of the high voltage circuit to the side of the low voltage circuit, and the passing current is greater than the target current.

9. A power system, comprising:
a high voltage circuit, having a high voltage power source;
a low voltage circuit, having a low voltage power source, wherein a used voltage range of the low voltage power source with respect to a closed circuit voltage overlaps with the high voltage power source, and a static voltage of the low voltage power source is lower than the high voltage power source;
a voltage converter, converting a voltage between the high voltage circuit and the low voltage circuit;
a power converter, converting power between the high voltage circuit and a driving motor;
a passing current obtaining section, obtaining a passing current which is a current flowing through the voltage converter;
a passing current control section, operating the voltage converter so that the passing current becomes a target current; and
a failure determining section, determining failure of the voltage converter based on a difference between the passing current and the target current,
wherein the failure determining section determines that the voltage converter fails in a case where the difference is greater than a predetermined value and the passing current is greater than the target current.

10. The power system as claimed in claim 9, comprising:
wherein at least in a case where the passing current flows from the side of the low voltage circuit to the side of the high voltage circuit, the failure determining section determines that the voltage converter is normal.

11. The power system as claimed in claims 10, comprising:
wherein at least in a case where the passing current is smaller than the target current, the failure determining section determines that the voltage converter is normal.

12. The power system as claimed in claim 11, comprising:
wherein the failure determining section determines that the voltage converter fails in a case where the difference is greater than the predetermined value, the passing current flows from the side of the high voltage circuit to the side of the low voltage circuit, and the passing current is greater than the target current.

13. The power system as claimed in claim 10, comprising:
wherein the failure determining section determines that the voltage converter fails in a case where the difference is greater than the predetermined value, the passing current flows from the side of the high voltage circuit to the side of the low voltage circuit, and the passing current is greater than the target current.

14. The power system as claimed in claim 9, comprising:
wherein at least in a case where the passing current is smaller than the target current, the failure determining section determines that the voltage converter is normal.

15. The power system as claimed in claim 14, comprising:
wherein the failure determining section determines that the voltage converter fails in a case where the difference is greater than the predetermined value, the passing current flows from the side of the high voltage circuit to the side of the low voltage circuit, and the passing current is greater than the target current.

16. The power system as claimed in claim 9, comprising:
wherein the failure determining section determines that the voltage converter fails in a case where the difference is greater than the predetermined value, the passing current flows from the side of the high voltage circuit to the side of the low voltage circuit, and the passing current is greater than the target current.

* * * * *